US008909524B2

(12) United States Patent
Stoltz et al.

(10) Patent No.: US 8,909,524 B2
(45) Date of Patent: Dec. 9, 2014

(54) ADAPTIVE ACTIVE NOISE CANCELING FOR HANDSET

(75) Inventors: Thomas Stoltz, Melrose, MA (US); Kim Spetzler Berthelsen, Koege (DK); Robert Adams, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 559 days.

(21) Appl. No.: 13/154,997

(22) Filed: Jun. 7, 2011

(65) Prior Publication Data

US 2012/0316872 A1 Dec. 13, 2012

(51) Int. Cl.
*G10L 15/20* (2006.01)

(52) U.S. Cl.
USPC ............................ 704/233; 704/210; 704/215

(58) Field of Classification Search
USPC ............ 381/71.1, 71.8, 71.11, 71.6; 704/208, 704/226, 200, 210, 214, 215, 233; 379/406.08
See application file for complete search history.

(56) References Cited

U.S. PATENT DOCUMENTS

| | | | | |
|---|---|---|---|---|
| 5,251,262 | A | 10/1993 | Suzuki et al. | |
| 5,425,105 | A | 6/1995 | Lo et al. | |
| 5,646,991 | A * | 7/1997 | Sih | 379/406.08 |
| 5,699,436 | A | 12/1997 | Claybaugh et al. | |
| 5,740,256 | A | 4/1998 | Castello Da Costa et al. | |
| 6,118,878 | A | 9/2000 | Jones | |
| 6,741,707 | B2 | 5/2004 | Ray et al. | |
| 7,031,460 | B1 | 4/2006 | Zheng et al. | |
| 8,189,799 | B2 * | 5/2012 | Shridhar et al. | 381/71.1 |
| 8,452,023 | B2 * | 5/2013 | Petit et al. | 381/71.8 |
| 2005/0185813 | A1 | 8/2005 | Sinclair et al. | |
| 2010/0014685 | A1 * | 1/2010 | Wurm | 381/71.11 |
| 2010/0172510 | A1 | 7/2010 | Juvonen | |
| 2010/0260345 | A1 | 10/2010 | Shridhar et al. | |
| 2010/0280824 | A1 | 11/2010 | Petit et al. | |
| 2011/0222700 | A1 * | 9/2011 | Bhandari | 381/71.6 |
| 2011/0264447 | A1 * | 10/2011 | Visser et al. | 704/208 |

FOREIGN PATENT DOCUMENTS

| | | |
|---|---|---|
| CN | 1662018 | 8/2005 |
| CN | 101043560 | 9/2007 |
| CN | 101859563 | 10/2010 |
| WO | 2008/096125 | 8/2008 |

* cited by examiner

*Primary Examiner* — Huyen X. Vo
(74) *Attorney, Agent, or Firm* — Kenyon & Kenyon LLP

(57) ABSTRACT

Embodiments of the present invention provide an adaptive noise canceling system. The adaptive noise canceling system may be used in a handset to cancel background noise by generating an anti-noise signal. The adaptive noise canceling system may include first input to receive a first signal from a feedforward microphone; a second input to receive a second signal from an error microphone; a controller coupled to the inputs, the controller configured to adaptively generate an anti-noise signal according to the received signals, wherein the controller derives a profile of the anti-noise signal from the first signal and derives a magnitude of the anti-noise signal from both first and second signal; and an output to transmit the anti-noise signal to a speaker.

37 Claims, 11 Drawing Sheets

100

100

200

300

400

600

700

800

1000

ADAPTIVE ACTIVE NOISE CANCELING FOR HANDSET

BACKGROUND

The present invention relates to noise canceling in handsets such as mobile phones. Telecommunication is growing at an incredible rate. Accordingly, handset engineers are constantly trying to improve the communication experience for the user.

One major problem in telecommunication systems is the presence of background noise (ambient noise) that can interfere with the user's hearing (i.e., the user's ability to understand what is being communicated). Often times, a user may use a mobile phone in a noisy environment such as a restaurant, a train station, or on the street. The background noise prevents the user from hearing the caller's voice on the other end of the phone call (far-end speaker). Therefore, the user is unable to use his/her mobile phone in noisy environments as he/she would like to, which constrains the use of the mobile phone immensely. As a result, there is a need in the art to improve communication systems to enable handsets to be used in the presence of locally-generated noise without the background noise interfering with the user's hearing of the far-end speaker.

Unlike other audio listening systems such as headphones where the background noise is controlled and static because of headphone cushions, handsets encounter background noise that is dynamic, uncontrolled, and unpredictable. Thus, conventional noise canceling systems for headphones are not optimal for handset use.

Accordingly, the inventors recognized a need in the art for an adaptive noise canceling system that can adapt to real world conditions.

BRIEF DESCRIPTION OF THE DRAWINGS

FIG. 1(*b*) is a diagram of a handset according to an embodiment of the present invention.

DETAILED DESCRIPTION

Embodiments of the present invention provide a system including a first input to receive a first signal from a feedforward microphone; a second input to receive a second signal from an error microphone; a controller coupled to the inputs, the controller configured to adaptively generate an anti-noise signal according to the received signals, wherein the controller derives a profile of the anti-noise signal from the first signal and derives a magnitude of the anti-noise signal from both first and second signals; and an output to transmit the anti-noise signal to a speaker.

Embodiments of the present invention also provide a method comprising receiving a feedforward input from a first microphone; receiving an error input from a second microphone; calculating a background noise signal based on the feedforward input and the error input; adaptively generating an anti-noise signal that is 180° out of phase with the background noise signal; and outputting the anti-noise signal to a speaker.

Embodiments of the present invention further provide a handset including a speaker; a feedforward microphone; an error microphone, wherein the error microphone is located closer to the speaker than the feedforward microphone; and an adaptive noise control system, coupled to the feedforward and error microphone, to generate an anti-noise signal based on background noise captured from the feedforward microphone and an error signal captured from the error microphone, and to output the anti-noise signal to the speaker.

Figure 1A:
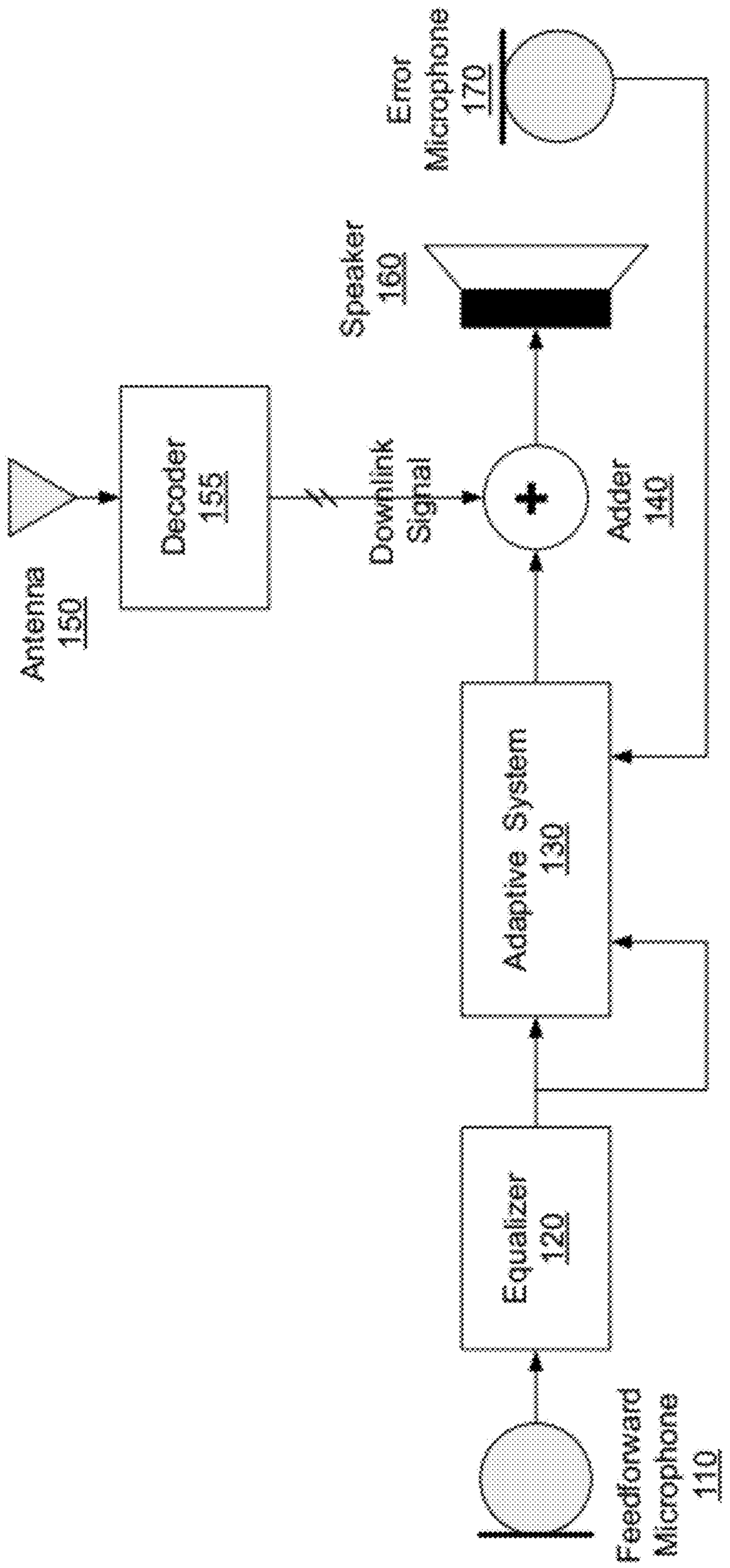
FIG. 1(*a*) is a simplified block diagram of a handset according to an embodiment of the present invention.
Figure 1B:
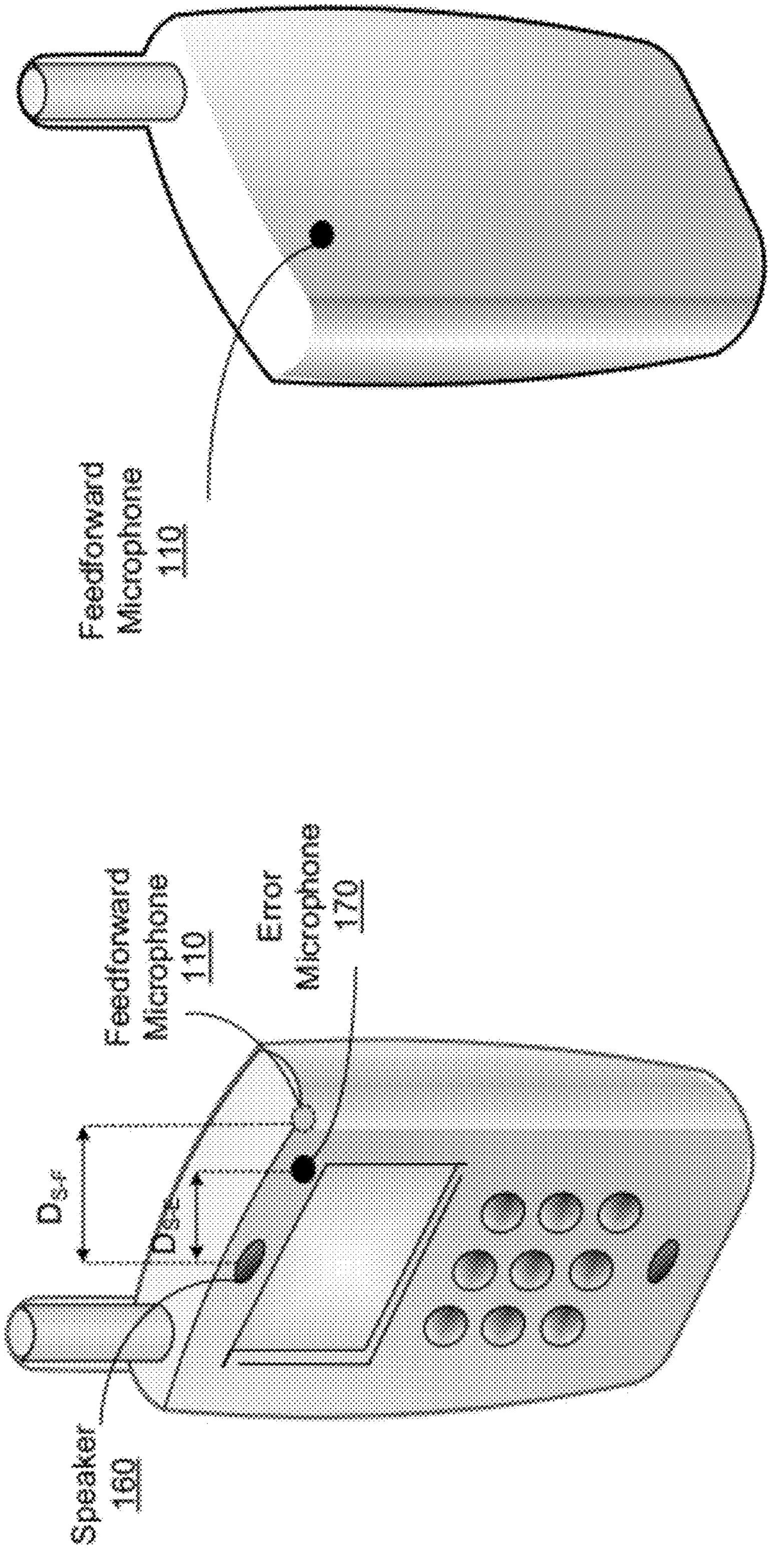

FIG. 1(*a*) is a block diagram of a handset 100 with adaptive active noise canceling (ANC) according to an embodiment of the present invention. The adaptive ANC may provide an anti-noise signal to the handset speaker where it destructively interferes with the background noise at the user's eardrum. Thus, the user may listen to the caller on the other end of the phone call with reduced background noise interference. The adaptive noise control may be implemented in a feedforward manner using two microphone inputs.

The handset 100 may include a feedforward microphone 110, an equalizer 120, an adaptive system 130, an adder 140, an antenna 150, a decoder 155, a speaker 160, and an error microphone 170.

FIG. 1(*b*) is a diagram of the handset 100 to show the relative placements of the feedforward microphone 110, the speaker 160, and the error microphone 170 according to an embodiment of the present invention. In this embodiment, the error microphone 170 may be located on a front side of the handset with the speaker 160, and the feedforward microphone 110 may located on back side of the handset opposite the error microphone 170. As illustrated in FIG. 1(*b*), the distance between the speaker 160 and the error microphone 170, $D_{S-E}$, may be shorter than the distance between the speaker 160 and feedforward microphone 110, $D_{S-F}$. Hence, the speaker 160 may be closer to the error microphone 170 than to the feedforward microphone 110.

The feedforward microphone 110 may capture audio input such as background noise. The output of the feedforward microphone 110 may be coupled to the equalizer 120. The equalizer 120 may filter the feedforward microphone signal to compensate for acoustic variations. For example, the equalizer 120 may compensate for the shaping of the speaker 160 and acoustic transfer function between the feedforward microphone 110 and the speaker 160. The filtered output of the equalizer 120 may then be provided to the adaptive system 130.

The adaptive system 130 may also receive an input from the error microphone 170. Using the feedforward microphone 110 input and error microphone 170 input, the ANC system 130 may generate an anti-noise signal, which may be an inversion of estimate background noise. The adaptive system 130 may derive the profile of the background noise present in the local environment from the feedforward input. The adaptive system 130 also may adjust the energy magnitude of the anti-noise signal based on the error input because the error microphone 170 may be located close to the speaker 160. The error signal captured by the error microphone 170 may be used in the anti-noise signal adaptation, but the content of the error signal does not have to be used. The error signal captured by the error microphone 170 may correspond to a mix of the background noise, anti-noise, a downlink signal, and the user's voice. Thus, the error signal captured by the error microphone 170 may be a sum of the above signals. The anti-noise signal may be generated as a replica of the acoustic noise that enters the user's ear directly from the environment. The anti-noise signal, however, may be 180° out of phase with the acoustic noise so that it destructively interferes with the acoustic noise at the user's eardrum. The destructive interference may cancel the acoustic noise at the user's eardrum and, thus, enhances the user's ability to hear the far-end signal. The anti-noise signal generated by the adaptive system 130 may be outputted to an adder 140. Further, the anti-noise signal may be generated continuously to adapt to the user's environment.

The antenna 150 may receive a downlink signal. The radio frequency downlink signal may then be demodulated and decoded by the decoder 155 to generate a downlink signal that may contains audio signals from the far-end speaker. The decoder 155 may process CDMA, TDMA, OFDM, or any other known wireless protocol signals, the processing includes demodulating and speech decoding. The adder 140 may combine the anti-noise signal and the downlink signal. The signals inputted into the adder 140 may have different sampling rates that need to be handled. The combined signal may be outputted to the speaker 160. Therefore, the user may receive the downlink signal including the far-end signal and the anti-noise signal at the user's eardrum, which may be placed at the speaker 160. With the anti-noise signal destructively interfering with the acoustic noise present in the environment, the user may more clearly listen to the far-end signal. Thus, the present invention may provide a more pleasant communication experience for the user.

Portions of the present invention may be provided on integrated circuits. For example, the adaptive system 130 may be provided on an integrated circuit. Other components coupled to the adaptive system 130 may also be provided on the same integrated circuit as the ANC system 130 or on separate integrated circuits.

Figure 2:
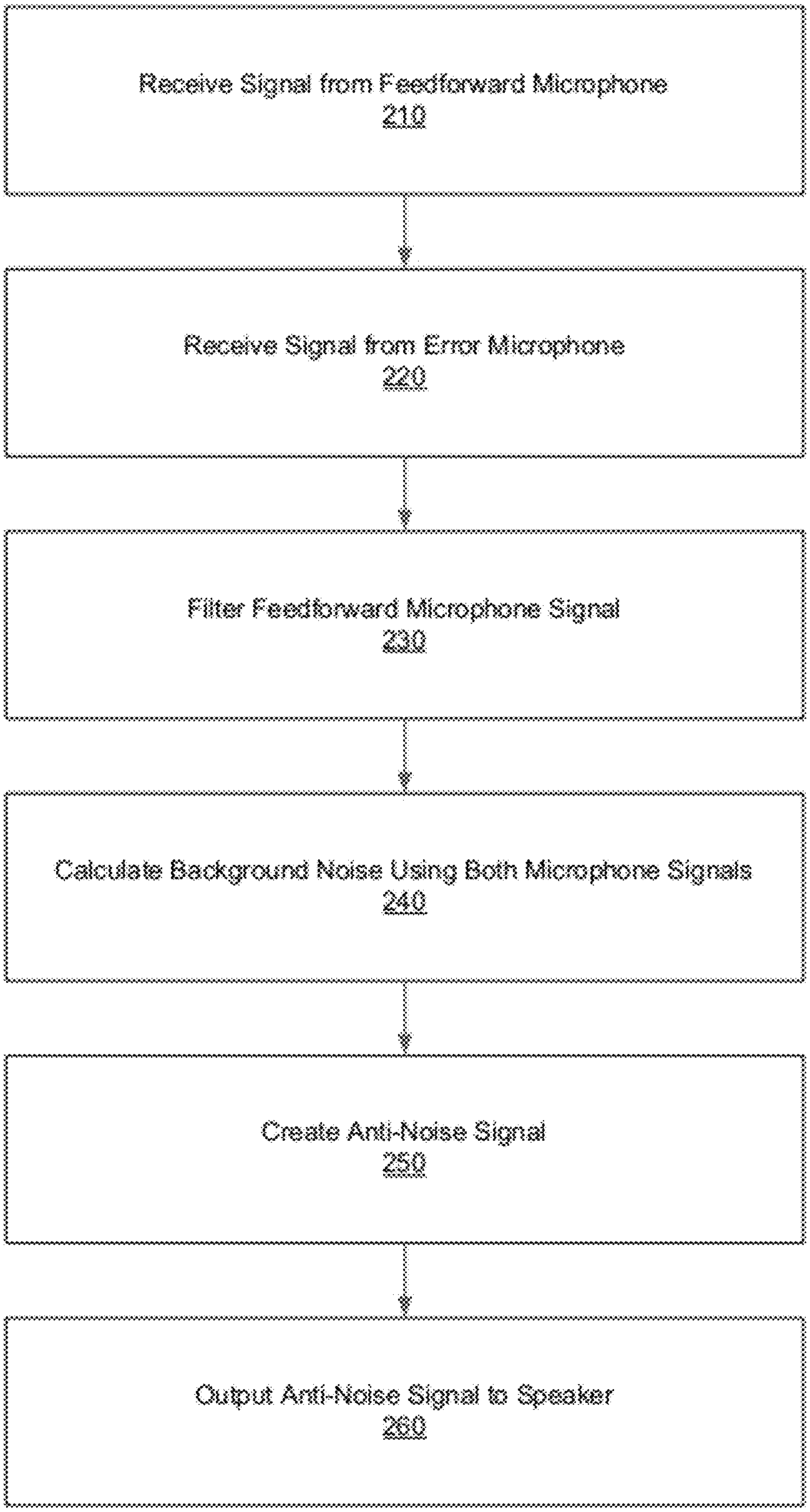
FIG. 2 is a simplified process flow for anti-noise signal generation operation according to an embodiment of the present invention.

FIG. 2 illustrates an anti-noise signal generation method 200 according to an embodiment of the present invention. A feedforward microphone signal may be received (block 210). The feedforward microphone signal may include the user's voice, which may not be continuous, and background noise present in the user's environment. An error microphone signal may be received (block 220). The feedforward microphone signal may be filtered to compensate for speaker and acoustic variations (block 230). Background noise may be then calculated using both feedforward microphone and error microphone signal (block 240). The feedforward microphone signal may provide the profile (shape) of the calculated background noise and the error microphone signal may be used to adjust the magnitude (size) of the calculated background noise. The error microphone signal may include a mix of the background noise, a downlink signal, and the user's voice. An anti-noise signal may be generated that has the same profile and shape of the calculated background noise but is 180° out of phase (block 250). Further, the anti-noise signal may be generated continuously to adapt to the user's environment. The anti-noise signal may be outputted to a speaker (block 260). From the speaker output, the anti-noise signal may destructively interfere with the background noise at the user's eardrum and, thus, canceling the background noise.

Figure 3:
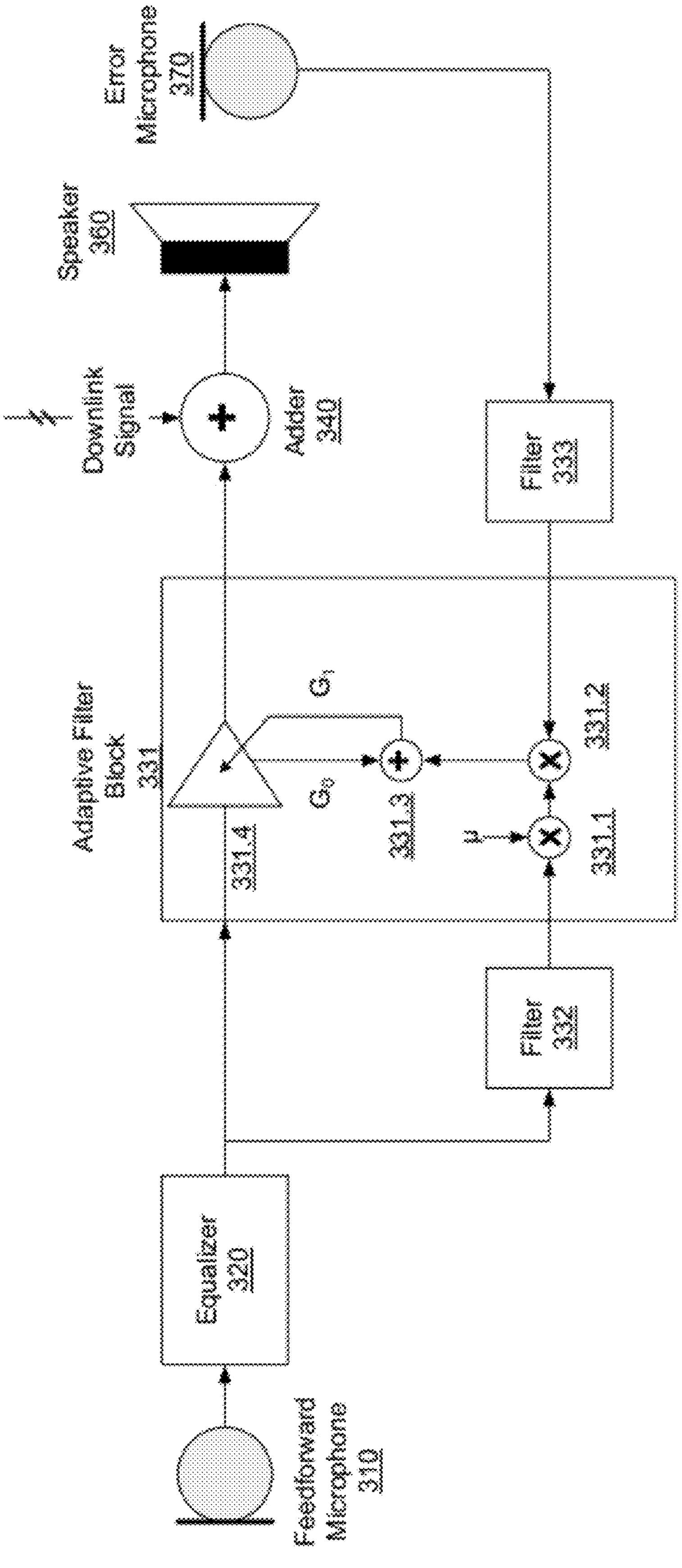
FIG. 3 is a simplified block diagram of a handset according to an embodiment of the present invention.

In one embodiment of the present invention, the adaptive ANC system may perform an adaptive filtering LMS (Least Mean Squared) algorithm. FIG. 3 is a simplified block diagram of a handset 300 with adaptive noise control according to an embodiment of the present invention. The handset 300 may include a feedforward microphone 310, an equalizer 320, an adaptive filter block 331, a filter 332, a filter 333, an adder 340, an antenna (not shown), a decoder (not shown), a speaker 360, and an error microphone 370. The speaker 360 may be closer to the error microphone 370 than to the feedforward microphone 310.

The feedforward microphone 310 may capture audio input such as background noise. The output of the feedforward microphone 310 may be coupled to the equalizer 320. The equalizer 320 may filter the feedforward microphone signal to compensate for acoustic variations. For example, the equalizer 320 may compensate for the shaping of the speaker 360 and acoustic transfer function between the feedforward microphone 310 and the speaker 360. The filtered output of the equalizer 320 may then be provided to the adaptive filter block 331 and filter 332. An energy level of the background noise present near the user's ear may be derived from the error microphone 370 signal input.

The filter 332 may receive the equalizer output and filters the feedforward signal for a frequency range where the adaptive noise cancellation may be optimal. For example, filter 332 may be a bandpass filter with cut-off frequencies of 200 Hz and 1000 Hz. The filter 333 may receive the signal captured by the error microphone and may filter the signal for the same frequency range as filter 333. The filters 332 and 333 may be outside the adaptive filter 331 or in another embodiment may be integrated inside the adaptive filter block 331.

The adaptive filter block 331 may receive the feedforward signal and create an anti-noise signal according to the feedforward signal and error signal. The adaptive filter block 331 may include a multiplier 331.1, a second multiplier 331.2, an adder 331.3, and an adaptive noise coefficient element 331.4. In an embodiment, the adaptive noise coefficient element 331.4 may include multiple elements.

The multiplier 331.1 may apply a weighting coefficient to the feedforward signal. The weighting coefficient may depend on the sampling frequency and/or eigenvalue spread of the feedforward signal. For example, the weighting coefficient may be 0.005. The multiplier 331.2 may multiply the output of multiplier 331.1 and the error signal. The error signal may represent the energy level of the background noise close to the speaker and, thus, may control the magnitude of the anti-noise signal. The output of multiplier 331.2 may be inputted to the adder 331.3. The previous LMS coefficient $G_0$ may also be inputted into the adder 331.3 to generate a new LMS coefficient $G_1$. Hence, The LMS coefficient may be calculated according to the equation:

$$G_1=G_0+\mu*F*E,$$

where $G_1$ is the updated LMS coefficient, $G_0$ is the previous LMS coefficient, μ is the weighting coefficient, F is the feedforward signal, and E is the error signal (energy level). In conventional LMS algorithms, the energy signal is usually calculated; however, in the present invention the error signal may be measured and mixed acoustically.

The adaptive noise coefficient element 331.4 may receive the feedforward signal and generate the anti-noise signal according to the LMS coefficient. The adaptive noise coefficient element 331.4 may adjust the gain level of the anti-noise signal according to the LMS coefficient to match the background noise level.

The anti-noise signal may be generated as a replica of the acoustic noise that enters the user's ear directly from the environment. The anti-noise signal, however, may be 180° out of phase with the acoustic noise so that it destructively interferes with the acoustic noise at the user's eardrum. The destructive interference may cancel the acoustic noise at the user's eardrum and, thus, enhances the user's ability to hear the far-end signal.

The anti-noise signal generated by the adaptive system 330 may be outputted to an adder 340. Further, the anti-noise signal may be generated continuously to adapt to the user's environment. The adder 340 may combine the anti-noise signal and the downlink signal. The signals inputted into the adder 140 may have different sampling rates that need to be handled. The combined signal may be outputted to the speaker 360. Therefore, the user may receive the downlink signal including the far-end signal and the anti-noise signal at the user's eardrum, which may be placed at the speaker 360. With the anti-noise signal destructively interfering with the acoustic noise present in the environment, the user may more clearly listen to the far-end signal.

Portions of the present invention may be provided on integrated circuits. For example, the adaptive system may be provided on an integrated circuit. Other components coupled to the adaptive system may also be provided on the same integrated circuit as the ANC system or on separate integrated circuits.

In one embodiment of the present invention, a speech detector may be included to control adaptive noise canceling operations. Speech may be detected in the downlink channel, which is referred to as the far-end speaker. If speech is detected, adaptation processes within the adaptive ANC system may be suspended for the duration of the detected speech. During the detected speech period, the adaptive ANC system may still produce an anti-noise signal but may suspend its adaptation operation.

Figure 4:
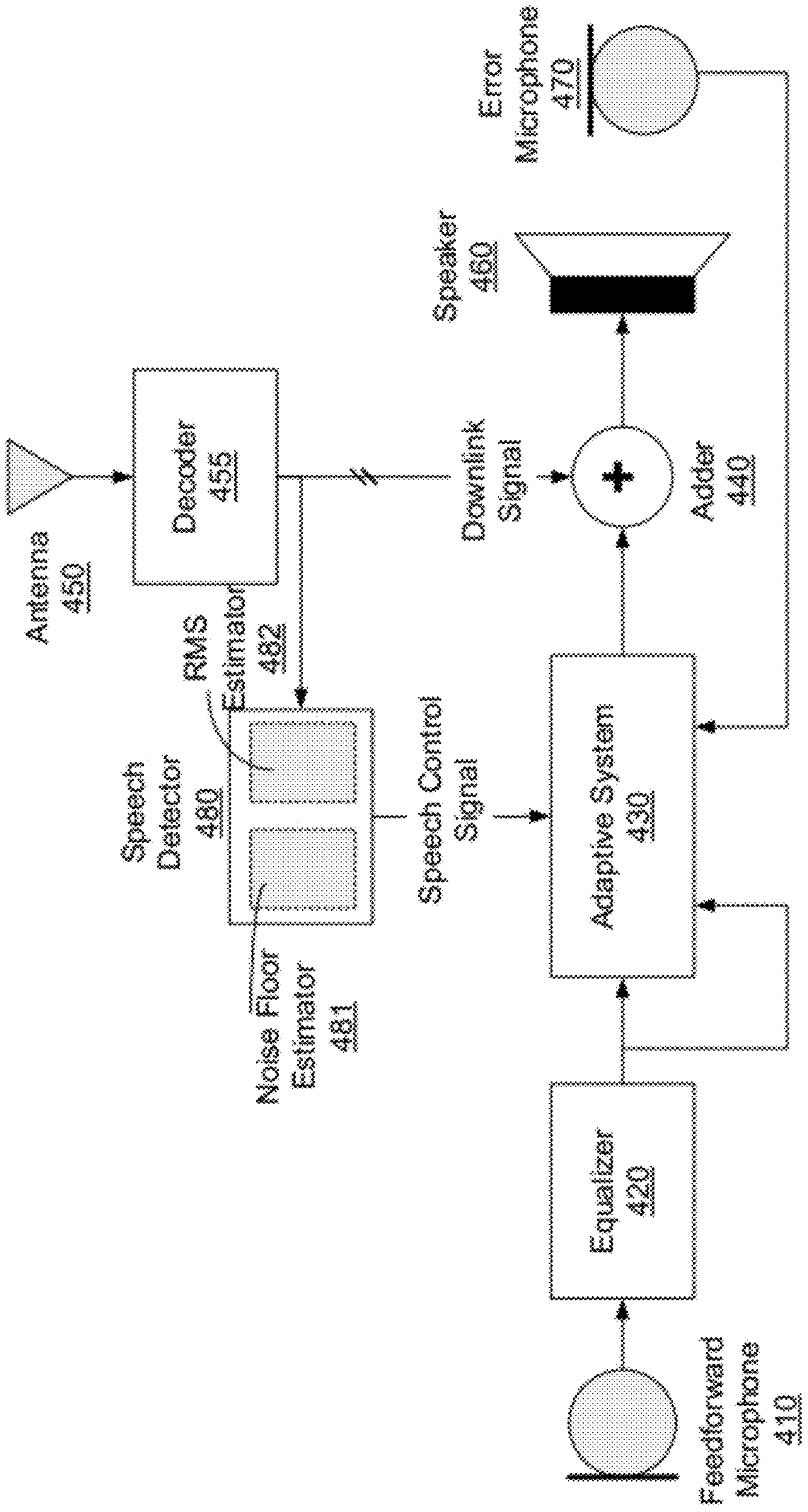
FIG. 4 is a simplified block diagram of a handset according to an embodiment of the present invention.

FIG. 4 is a simplified block diagram of a handset 400 with an adaptive ANC and speech detection according to an embodiment of the present invention. The handset 400 may include a feedforward microphone 410, an equalizer 420, an adaptive system 430, and adder 440, an antenna 450, a decoder 455, a speaker 460, an error microphone 470, and a speech detector 480. The speech detector may include a noise floor estimator and a RMS (Root Mean Square) estimator. The speaker 460 may be closer to the error microphone 470 than to the feedforward microphone 410.

The feedforward microphone 410 may capture audio input mainly background noise. The output of the feedforward microphone 410 may be coupled to the equalizer 420. The equalizer 420 may filter the feedforward microphone signal to compensate for acoustic variations. For example, the equalizer 420 may compensate for the shaping of the speaker 460 and acoustic transfer function between the feedforward microphone 410 and the speaker 460. The filtered output of the equalizer 420 may then be provided to the adaptive noise control system 430.

The adaptive system 430 may also receive an input from the error microphone 470. Using the feedforward microphone 410 input and error microphone 470 input, the adaptive noise control system 430 may generate an anti-noise, which may be an inversion of estimate background noise. The adaptive system 430 may derive the profile of the background noise present in the local environment from the feedforward input. The adaptive system 430 also may adjust the energy magnitude of the anti-noise signal based on the error input because the error microphone 470 may be located close to the speaker 460. The error signal captured by the error microphone 470 may be used in the anti-noise signal adaptation, but the content of the error signal does not have to be used. The error signal captured by the error microphone 170 may correspond to a mix of the background noise, a downlink signal, and the user's voice. Thus, the error signal captured by the error microphone 170 may be a sum of the above signals. The anti-noise signal may be generated as a replica of the acoustic noise that enters the user's ear directly from the environment. The anti-noise signal, however, may be 180° out of phase with the acoustic noise so that it destructively interferes with the acoustic noise at the user's eardrum. The destructive interference may cancel the acoustic noise at the user's eardrum and, thus, enhances the user's ability to hear the far-end signal.

The anti-noise signal generated by the adaptive system 430 may be outputted to an adder 440. The antenna 450 may receive a downlink signal. The radio downlink signal may then be demodulated and decoded by the decoder 455 to generate a downlink signal that contains audio signals from the far-end speaker. The decoder 455 may process CDMA, TDMA, OFDM, or any other known wireless protocol signals, the processing includes demodulating and speech decoding.

The adder 440 may combine the anti-noise signal and the downlink signal. The signals inputted into the adder 140 may have different sampling rates that need to be handled. The combined signal may be outputted to the speaker 460. Therefore, the user may receive the downlink signal including the far-end signal and the anti-noise signal at the user's eardrum, which may be placed at the speaker 460. With the anti-noise signal destructively interfering with the acoustic noise present in the environment, the user may more clearly listen to the far-end signal.

The speech detector 480 may generate a speech control signal according to the presence or non-presence of speech in the downlink channel. The speech detector may include two estimators, the noise-floor level estimator 481 and the RMS level estimator 482 of the downlink channel. The estimators may correspond to a modulation level of the signals. The difference of the two estimators may be compared to a threshold level. If the level is above the threshold, it may be determined that speech is present in the downlink channel. Upon the detection of speech, the speech control signal may be outputted to the ANC system 430 to instruct the ANC system to suspend its adaptation and "freeze" its anti-noise coefficient updating. The ANC system may still output an anti-noise signal but may freeze its adaptation process. When speech is no longer detected in the downlink channel, the ANC system 430 may resume its adaptation operation.

In another embodiment, the speech detector may detect the user's voice when speaking on the handset. In this embodiment, the speech detector may include use of a voice microphone into which the user speaks into as a proximity detector. The voice microphone may be a third microphone on the handset. The third microphone, for example, may be placed proximate the bottom end of the handset to capture speech from the user operating the handset.

Portions of the present invention may be provided on integrated circuits. For example, the adaptive system may be provided on an integrated circuit. Other components coupled to the adaptive system may also be provided on the same integrated circuit as the adaptive system or on separate integrated circuits.

Figure 5:
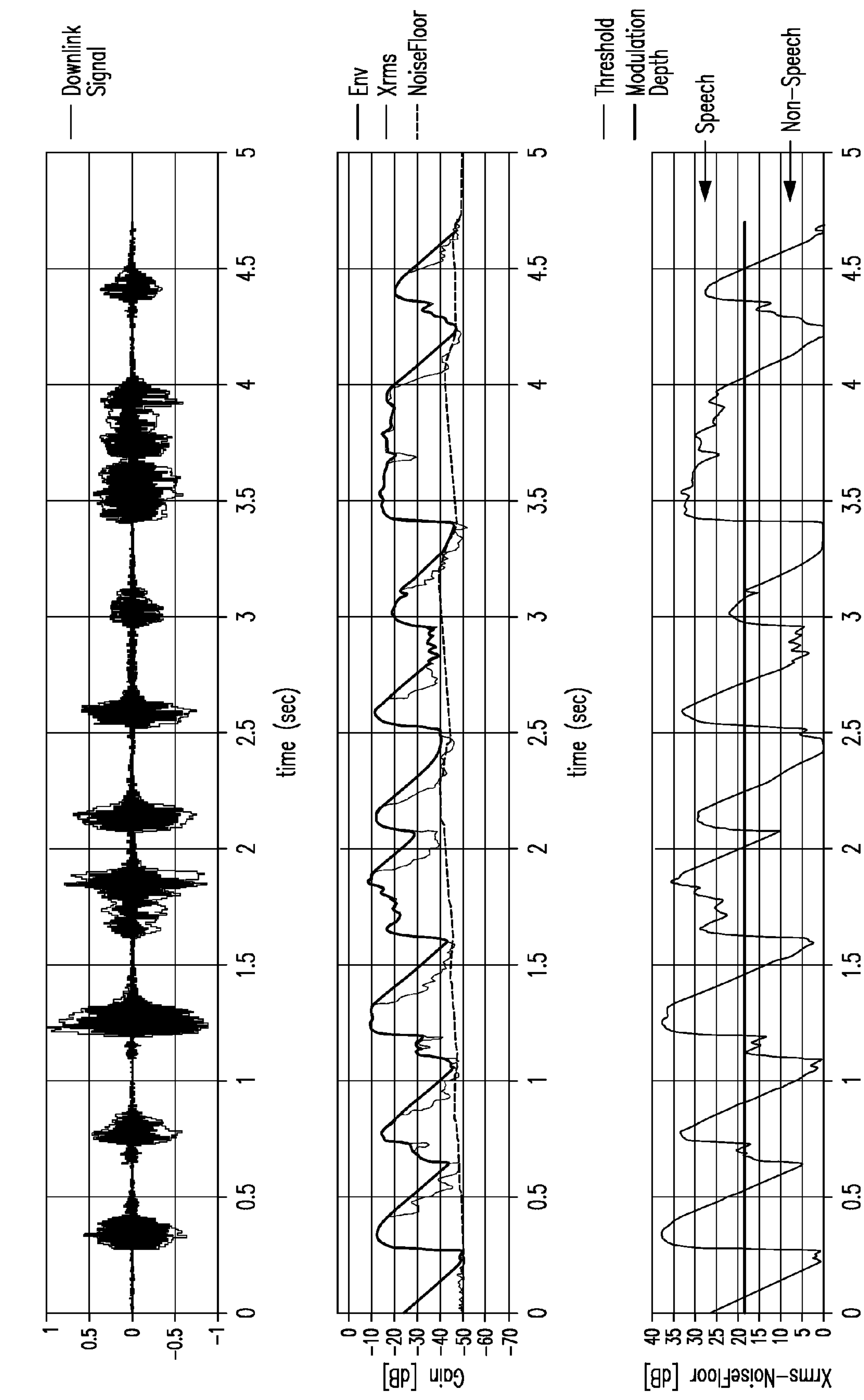
FIG. 5 illustrates a graph of an exemplary downlink signal with calculation of a modulation index.

FIG. 5 illustrates a graph showing speech in an exemplary downlink signal with calculation of a modulation index. In this example, noise-floor level and RMS level of the downlink signal may be measured as shown. The difference between the two estimators may be compared to a minimum threshold level for speech because the difference corresponds to a modulation level of the signal. Generally, the higher the modulation level, the likelier the signal may contain speech. For example, modulation levels higher than 18 dB may be classified as speech.

The suspension of the adaptation process of the anti-noise signal during speech detected periods may provide better overall noise canceling because speech in the downlink channel may interfere with the calculation of the background noise. For example, speech from downlink channel may be captured by the error microphone and provide inaccurate measurements of the background noise.

In one embodiment of the present invention, adaptive noise canceling operation may be controlled based on wind conditions. If wind is detected, the adaptive ANC system's operations may be adjusted accordingly. Wind is unpredictable and, therefore, cannot be adjusted for using the adaptive ANC system. Attempting to provide an anti-noise signal for wind noise may actually exacerbate the noisy conditions by adding more noise to the user's ear.

Figure 6:
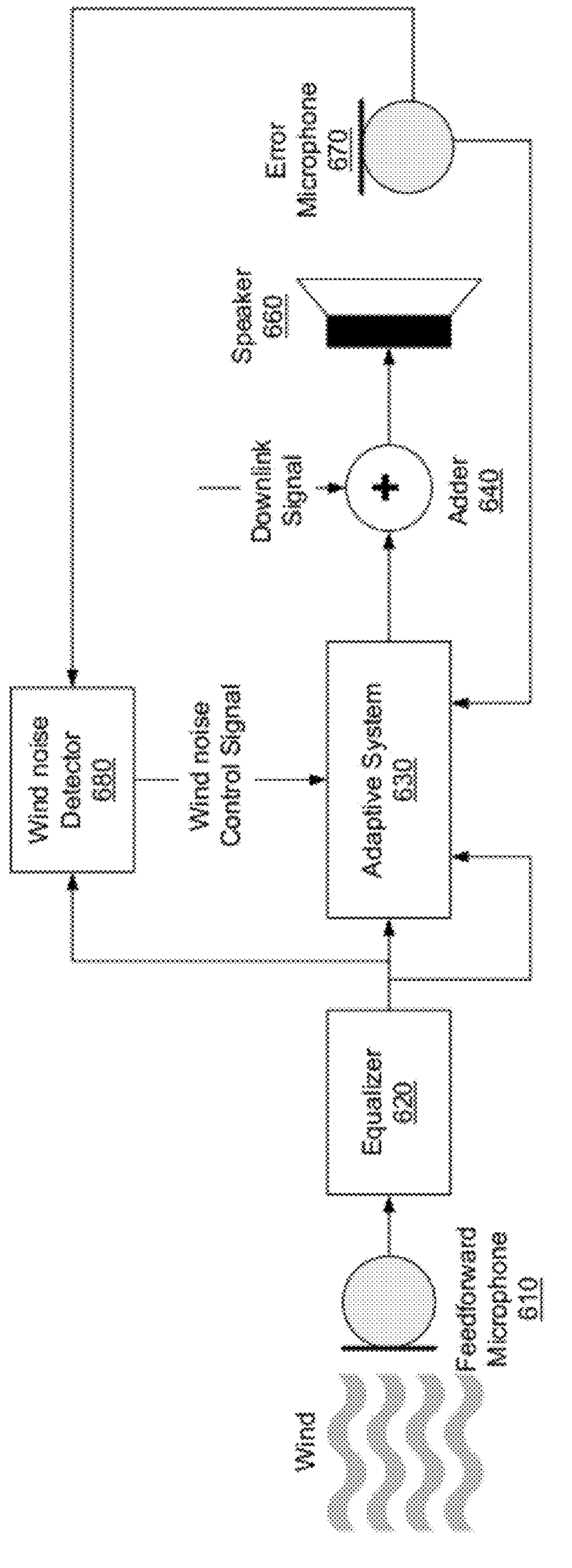
FIG. 6 is a simplified block diagram of a handset according to an embodiment of the present invention.

FIG. 6 is a simplified block diagram of a handset 600 with an adaptive noise control system and wind noise detection according to an embodiment of the present invention. The handset 600 may include a feedforward microphone 610, an equalizer 620, an adaptive system 630, and adder 640, an antenna 650, a decoder 655, a speaker 660, an error microphone 670, and a wind noise detector 680. The speaker 660 may be closer to the error microphone 670 than to the feedforward microphone 610.

The feedforward microphone 610 may capture audio input such as background noise. The output of the feedforward microphone 610 may be coupled to the equalizer 620. The equalizer 620 may filter the feedforward microphone signal to compensate for acoustic variations. For example, the equalizer 620 may compensate for the shaping of the speaker 660 and acoustic transfer function between the feedforward microphone 610 and the speaker 660. The filtered output of the equalizer 620 may then be provided to the adaptive system 630.

The adaptive system 630 may also receive an input from the error microphone 670. Using the feedforward microphone 610 input and error microphone 670 input, the adaptive system 630 may generate an anti-noise signal, which may be an inversion of estimate background noise. The adaptive system 630 may derive the profile of the background noise present in the local environment from the feedforward input. The adaptive system 630 also may adjust the energy magnitude of the anti-noise signal based on the error input because the error microphone 670 may be located close to the speaker 660. The energy level captured by the error microphone 670 may be used in the anti-noise signal generation, and the content of the error microphone signal does not have to be used. The energy level captured by the error microphone 170 may correspond to a mix of the background noise, a downlink signal, and the user's voice. Thus, the energy level captured by the error microphone 170 may be an average of the above signals. The anti-noise signal may be generated as a replica of the acoustic noise that enters the user's ear directly from the environment. The anti-noise signal, however, may be 180° out of phase with the acoustic noise so that it destructively interferes with the acoustic noise at the user's eardrum. The destructive interference may cancel the acoustic noise at the user's eardrum and, thus, enhances the user's ability to hear the far-end signal.

The anti-noise signal generated by the adaptive system 630 may be outputted to an adder 640. The antenna 650 may receive a downlink signal. The downlink signal may then be demodulated and decoded by the decoder 655 to generate a downlink signal that contains audio signals from the far-end speaker. The decoder 655 may process CDMA, TDMA, OFDM, or any other known wireless protocol signals, the processing includes demodulating and speech decoding.

The adder 640 may combine the anti-noise signal and the downlink signal. The signals inputted into the adder 140 may have different sampling rates that need to be handled. The combined signal may be outputted to the speaker 660. Therefore, the user may receive the downlink signal including the far-end signal and the anti-noise signal at the user's eardrum, which may be placed at the speaker 660. With the anti-noise signal destructively interfering with the acoustic noise present in the environment, the user may more clearly listen to the far-end signal.

The feedforward microphone 610 along with the error microphone 670 may also capture wind noise that may be present in the environment. The wind noise detector 680 may receive inputs from the feedforward and error microphones. To detect the presence of wind noise, the wind noise detector 680 may perform a correlation operation between the feedforward and error microphone signals. If the correlation operation indicates that the signals are similar, then it may be determined that wind noise is not present. On the other hand, if the correlation operation indicates that the signals are substantially different, then it may be determined that wind noise is present because wind noise will change the correlation between the two input signals. Accordingly, a wind noise control signal may be outputted to the ANC system 630 alerting the ANC system 630 of the presence or non-presence of wind.

The adaptive ANC system may adjust its operations in a few ways responding to wind conditions. In one embodiment, the adaptive ANC system may only suspend its adaptive operations and continue to provide an anti-noise signal. In this embodiment, the adaptive ANC system may still output an anti-noise signal but may freeze its adaptation process. When wind is no longer detected in the downlink channel, the adaptive ANC system may resume its adaptation operation.

In another embodiment, the adaptive ANC system may shut off the adaptive ANC system entirely and not provide an anti-noise signal during detected wind conditions. In another embodiment, the adaptive ANC system may fade out the anti-noise signal at the detection of wind conditions. For example, the adaptive ANC system may operate in a soft manner where the ANC fades out the anti-noise signal according to the magnitude of the wind.

Portions of the present invention may be provided on integrated circuits. For example, the adaptive system may be provided on an integrated circuit. Other components coupled to the adaptive system may also be provided on the same integrated circuit as the adaptive system or on separate integrated circuits.

Figure 7:
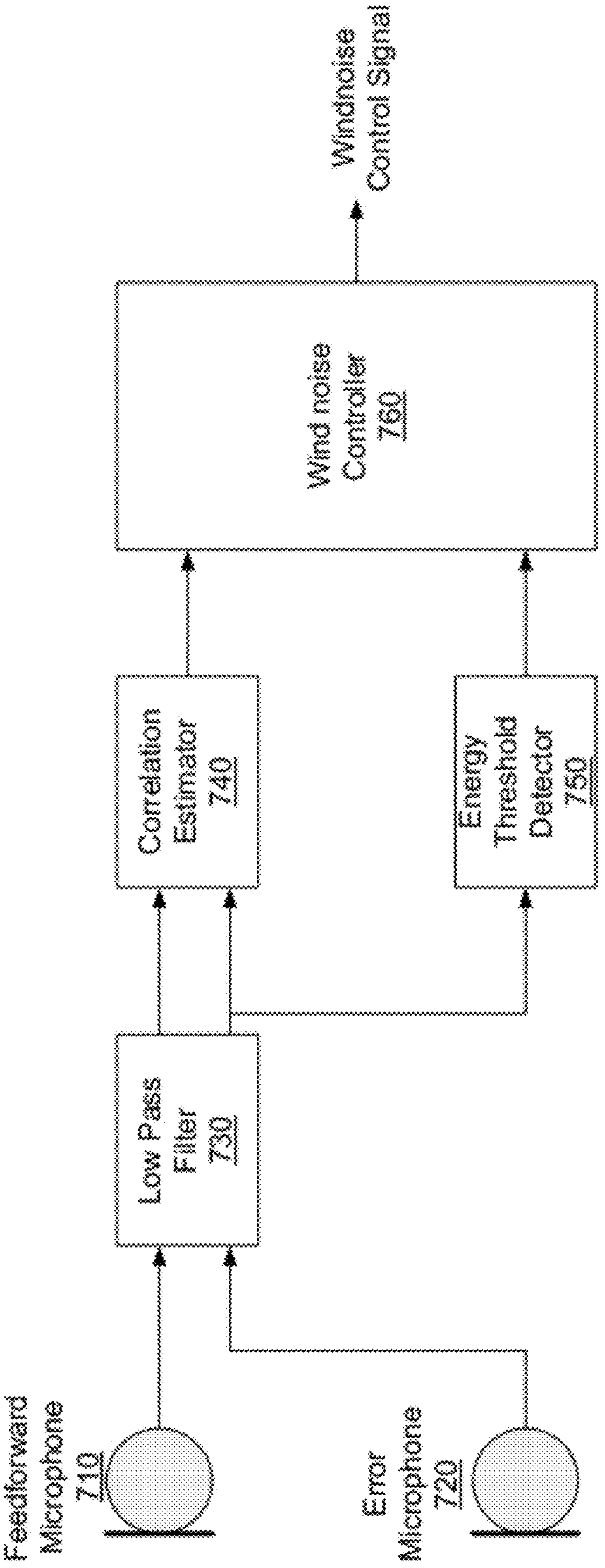
FIG. 7 is a simplified block diagram of a wind noise detector according to an embodiment of the present invention.

FIG. 7 is a simplified block diagram of a wind noise detector 700 according to an embodiment of the present invention. The wind noise detector 700 may be coupled to a feedforward microphone 710 and an error microphone 720. The wind noise detector may include a low pass filter 730, a correlation estimator 740, an energy threshold detector 750, and a wind noise controller 760.

The low pass filter 730 may receive inputs from both the feedforward and error microphones. The low pass filter 730 may pass through signals below a certain frequency level because wind noise is generally dominant in low frequencies below 1 KHz. For example, low pass filter 730 may be a 500 Hz low pass filter since wind usually appears below 1 KHz.

The feedforward and error signals after being filtered may be passed to the correlation estimator 740. The correlation estimator 740 may include time domain filters first order FIR filters. For example, the two input signals may be multiplied together to determine the correlation of the two input signals.

To minimize possible false errors in the detection of wind noise, the energy threshold detector 750 may compare the error signal, which has passed through low pass filter 730, to a minimum energy threshold. Wind noise is usually at a high energy level. Therefore, the energy threshold detector may allow the wind noise detector to output a wind noise control signal only when a sufficient amount of energy is detected. Thus, the energy threshold detector 750 may prevent false positives of wind noise detection.

The wind noise controller 760 may receive the correlation estimate and energy threshold detection output. The wind noise controller 760 may output a wind noise control signal to the ANC system accordingly. As described above, the wind noise control signal may be a hard decision to turn off the ANC system entirely or to turn off the adaptation operations only. Alternatively, the wind noise control signal may be a soft decision in adjusting the magnitude of the anti-noise signal, for example, to apply fading.

In one embodiment of the present invention, a noise floor estimator may be included to control adaptive noise canceling operations. The noise floor estimator may ensure that anti-noise is only generated when it will be beneficial. When background noise level is low, anti-noise is generally not required. An anti-noise signal, in fact, may adversely affect the user's listening experience when the background noise level is low. Anti-noise in the absence of high background noise can create a "sucking the ear-drum out" feeling for the user. Thus, it is beneficial to apply anti-noise only in optimal conditions for its use.

Figure 8:
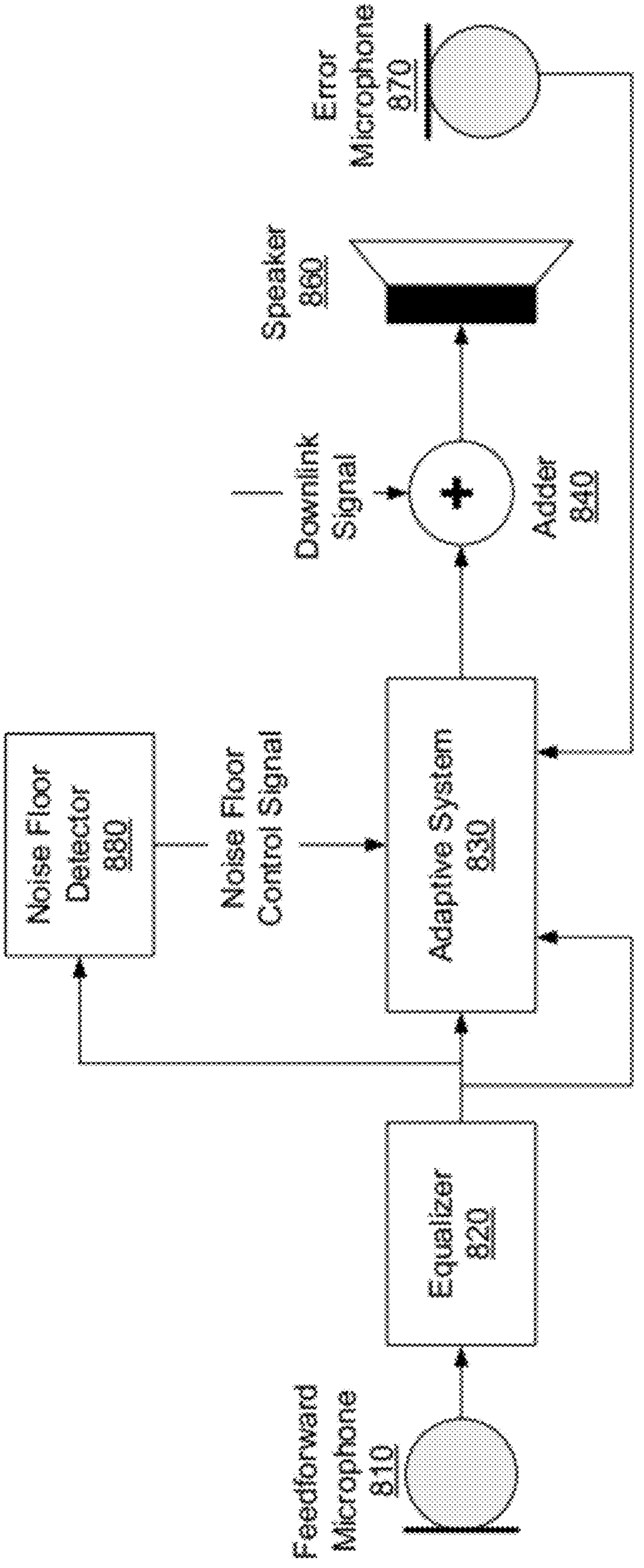
FIG. 8 is a simplified block diagram of a handset according to an embodiment of the present invention.

FIG. 8 is a simplified block diagram of a handset 800 with an adaptive ANC system and a noise floor estimator according to an embodiment of the present invention. The handset 800 may include a feedforward microphone 810, an equalizer 820, an adaptive system 830, an adder 840, an antenna 850, a decoder 855, a speaker 860, an error microphone 870, and a noise floor detector 880. The speaker 860 may be closer to the error microphone 870 than to the feedforward microphone 810.

The feedforward microphone 810 may capture audio input such as background noise. The output of the feedforward microphone 810 may be coupled to the equalizer 820. The equalizer 820 may filter the feedforward microphone signal to compensate for acoustic variations. For example, the equalizer 820 may compensate for the shaping of the speaker 860 and acoustic transfer function between the feedforward microphone 810 and the speaker 860. The filtered output of the equalizer 420 may then be provided to the adaptive noise control system 830.

The adaptive system 830 may also receive an input from the error microphone 870. Using the feedforward microphone 810 input and error microphone 870 input, the adaptive noise control system 830 may generate an anti-noise signal. signal, which may be an inversion of estimate background noise. The adaptive system 830 may derive the profile of the background noise present in the local environment from the feedforward input. The adaptive system 830 also may adjust the energy magnitude of the anti-noise signal based on the error input because the error microphone 870 may be located close to the speaker 860. The error signal captured by the error microphone 870 may be used in the anti-noise signal adaptation, but the content of the error microphone signal does not have to be used. The error signal captured by the error microphone 170 may correspond to a mix of the background noise, anti noise, a downlink signal, and the user's voice. Thus, the error signal captured by the error microphone 170 may be a sum of the above signals. The anti-noise signal may be generated as a replica of the acoustic noise that enters the user's ear directly from the environment. The anti-noise signal, however, may be 180° out of phase with the acoustic noise so that it destructively interferes with the acoustic noise at the user's eardrum. The destructive interference may cancel the acoustic noise at the user's eardrum and, thus, enhances the user's ability to hear the far-end signal.

The anti-noise signal generated by the adaptive noise control system 830 may be outputted to an adder 840. The antenna (not shown) may receive a downlink signal. The radio downlink signal may be demodulated and decoded by the decoder (not shown) to generate a downlink signal that contains audio signals from the far-end speaker. The decoder may process CDMA, TDMA, OFDM, or any other known wireless protocol signals, the processing includes demodulating and speech decoding.

The adder 840 may combine the anti-noise signal and the downlink signal. The signals inputted into the adder 140 may have different sampling rates that need to be handled. The combined signal may be outputted to the speaker 860. Therefore, the user may receive the downlink signal including the far-end signal and the anti-noise signal at the user's eardrum, which may be placed at the speaker 860. With the anti-noise signal destructively interfering with the acoustic noise present in the environment, the user may more clearly listen to the far-end signal.

The noise floor detector 880 may receive an input from the feedforward microphone. In response to the level of the noise floor the detector 880 may output a noise floor control signal to the ANC system. The noise floor detector 880 may have two thresholds, a minimum and a maximum threshold. The minimum threshold may correspond to the lowest amount of noise where an anti-noise signal may better the user's listening experience. The maximum threshold may correspond to the saturation point of the anti-noise signal.

Portions of the present invention may be provided on integrated circuits. For example, the adaptive system may be provided on an integrated circuit. Other components coupled to the adaptive system may also be provided on the same integrated circuit as the adaptive system or on separate integrated circuits.

Figure 9:
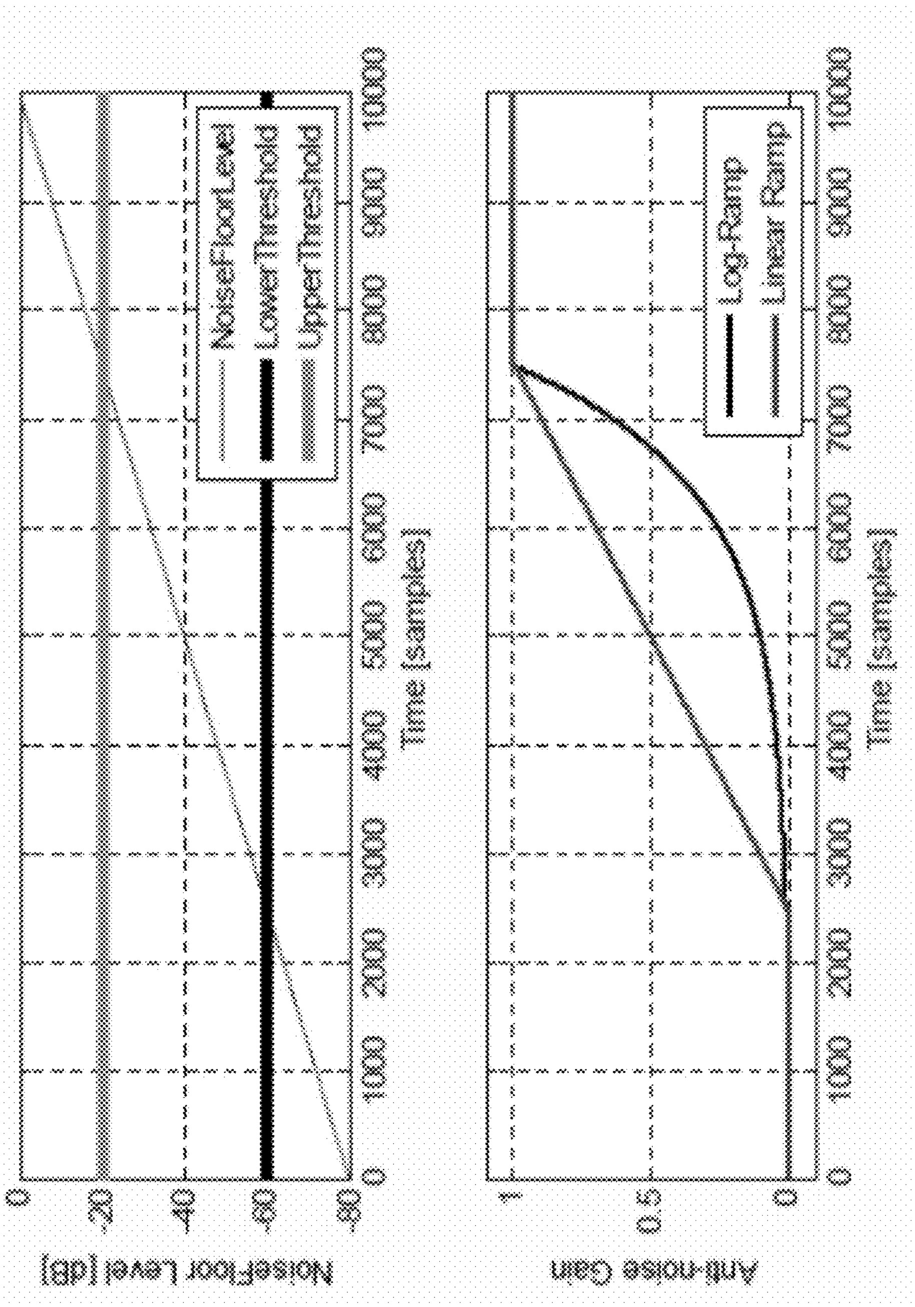
FIG. 9 illustrates a graph of different fading profiles based on an input signal's noise level.

FIG. 9 illustrates a graph with an exemplary noise-floor level and its corresponding anti-noise gain signal. It illustrates different fading profiles to smoothly enable and disable the anti-noise signal based on noise-floor levels. In the top graph, the two thresholds for the noise are shown as lower (minimum) and upper (maximum). Noise below the lower threshold may not require anti-noise because the noise level is too low for the anti-noise to improve hearing conditions for the user. The upper threshold may correspond to the saturation point of the anti-noise signal.

The anti-noise gain may be controlled within the adaptive ANC system. Alternatively, a variable gain amplifier may be placed following the ANC system. The variable gain amplifier may be controlled by the noise floor detector according to the amplifier gain profile.

In one embodiment of the present invention, the adaptive ANC system may include a limiter. Acoustical and mechanical coupling between the receiver and the feedforward microphone can sometimes be too strong causing the adaptive ANC system to become unstable. Thus, a limiter may be used to control the magnitude of the feedforward signal and, consequently, add stability to the adaptive ANC system.

Figure 10:
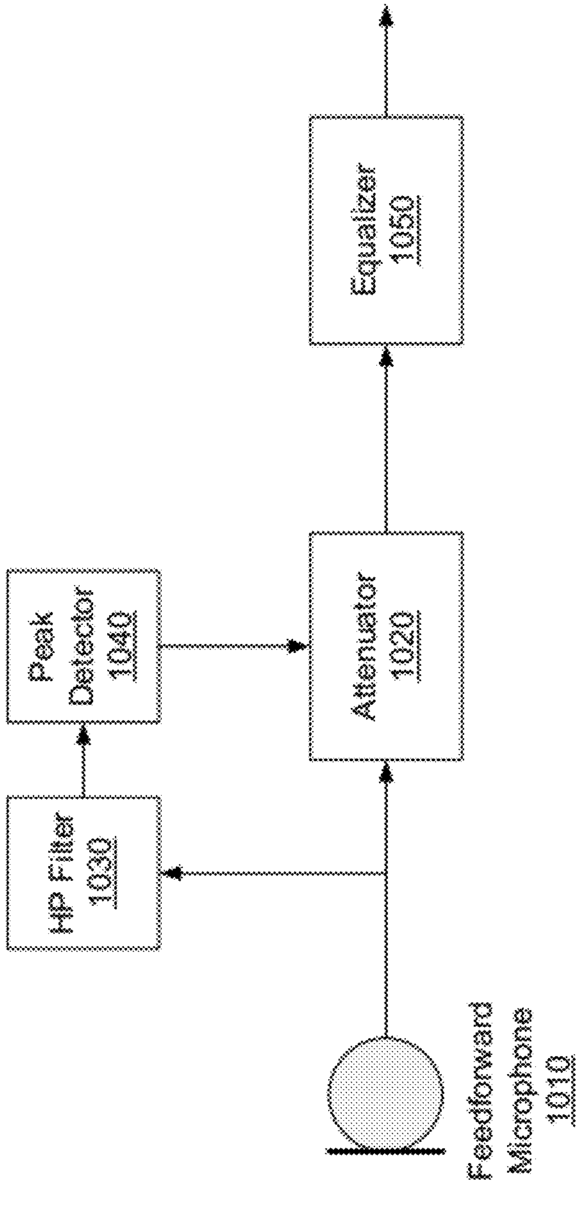
FIG. 10 is a simplified block diagram of a limiter according to an embodiment of the present invention.

FIG. 10 is a simplified block diagram of a limiter 1000 according to an embodiment of the present invention. The limiter 1000 may be coupled to a feedforward microphone 1010 and an equalizer 1050 where the limiter 1000 may receive a signal from the feedforward microphone 1010 and provide a limited feedforward signal to the equalizer 1050. The limiter 1000 may include an attenuator 1020, a high pass filter 1030, and a peak detector 1040. In another embodiment, the high pass filter 1030 may be a bandpass filter. The high pass filter 1030 may be matched to the frequency range where feedback is expected.

The attenuator 1020 may adjust the magnitude of the feedforward signal. For example, the attenuator 1020 may attenuate the signal until the signal stays below a certain threshold.

The peak detector 1040 may compare the input feedforward signal to a threshold level. If the signal is above the threshold, the peak detector 1040 may instruct the attenuator 1020 to attenuate the signal until the signal stays below the threshold. The limiter operation may be continuous. The peak detector 1040 may include two time constants. One constant for attack state and one constant of release state. Thus, the peak detector 1040 may scale the input signal according to its magnitude. By maintaining the level of the feedforward signal, the limiter may provide stability to the system.

Several embodiments of the present invention are specifically illustrated and described herein. However, it will be appreciated that modifications and variations of the present invention are covered by the above teachings. In other instances, well-known operations, components and circuits have not been described in detail so as not to obscure the embodiments. It can be appreciated that the specific structural and functional details disclosed herein may be representative and do not necessarily limit the scope of the embodiments.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A system, comprising:

a first input to receive a first signal from a feedforward microphone;

a second input to receive a second signal from an error microphone;

a controller coupled to the inputs, the controller configured to generate an anti-noise signal based on the first signal and the second signal;

an output to transmit the anti-noise signal to a speaker; and a speech detector, coupled to the controller, to detect speech and the controller further configured to suspend adaptive adjustment of the anti-noise signal while still providing the anti-noise signal at the output during detected periods of speech.

2. The system of claim 1, wherein the anti-noise signal is 180° out of phase with background noise.

3. The system of claim 1, wherein the second signal is an error signal between background noise, the anti-noise signal, and a downlink signal.

4. The system of claim 1, wherein the system is provided on an integrated circuit.

5. The system of claim 1, the controller comprises a filter block.

6. The system of claim 5, wherein the filter block executes an adaptive least mean squared (LMS) algorithm where an error signal is measured and is the second signal.

7. The system of claim 6, wherein a LMS coefficient is calculated by the filter block according to the equation:

$$G_1=G_0+\mu*F*E,$$

$G_1$ is the LMS coefficient, $G_0$ is the previous LMS coefficient, μ is a weighting coefficient, F is the first signal, and E is the error signal.

8. The system of claim 1, wherein the speech detector comprises a root mean square (RMS) level estimator and a noise floor estimator to determine whether speech detected is above a minimum threshold.

9. The system of claim 1, wherein the speech detector comprises a proximity detector.

10. The system of claim 1, further comprises a wind detector coupled to the feedforward input and error input, and configured to adjust adaptive generation of the anti-noise signal by the controller during wind detected periods.

11. The system of claim 10, wherein the controller suspends adaptive generation of the anti-noise signal while still providing the anti-noise signal at the output during wind detected periods.

12. The system of claim 10, wherein the controller suspends adaptive generation of the active noise signal and does not provide any anti-noise signal at the output during wind detected periods.

13. The system of claim 10, wherein the controller suspends adaptive generation of the active noise signal and fades out providing the anti-noise signal at the output during wind detected periods.

14. The system of claim 13, wherein the anti-noise signal is faded out according to the wind's magnitude.

15. The system of claim 10, wherein the wind detector comprises:

an energy detector receiving the second signal and generating an energy threshold output;

a correlation estimator receiving the first and second signals, generating a correlation estimate of the two signals; and a wind controller receiving the correlation estimate and energy threshold output and generating a wind control signal to be outputted to the controller.

16. The system of claim 15, wherein the wind detector further comprises a low pass filter.

17. The system of claim 16, wherein the low pass filter filters signals below 500 Hz.

18. The system of claim 1, further comprises a noise floor detector coupled to the first input to detect a noise level, wherein the controller halts anti-noise signal output if noise is below a minimum noise level threshold.

19. The system of claim 1, further comprises a noise floor detector coupled to the first input to detect a noise level, wherein the controller halts anti-noise signal output if noise is above a maximum noise level threshold.

20. The system of claim 1, further comprises a limiter to attenuate the first signal to keep the first signal below a limiting threshold.

21. A method, comprising:

receiving a feedforward input from a first microphone;

receiving an error input from a second microphone;

calculating a background noise signal based on the feedforward input and the error input;

generating an anti-noise signal that is out of phase with the background noise signal;

outputting the anti-noise signal to a speaker to be mixed with an audio input;

detecting speech; and suspending adjustment of the anti-noise signal while still outputting the anti-noise signal during detected speech periods.

22. The method claim 21, wherein the anti-noise signal is generated using an adaptive LMS algorithm with a measured error signal.

23. The system of claim 22, wherein a LMS coefficient is calculated by the filter block according to the equation:

$$G_1=G_0+\mu*F*E,$$

$G_1$ is the LMS coefficient, $G_0$ is the previous LMS coefficient, $\mu$ is a weighting coefficient, F is the feedforward signal, and E is the error signal.

24. The method claim 21, further comprises:

detecting wind based on the feedforward input and error input; and adjusting the adaptive generation of the anti-noise signal during detected wind periods.

25. The method of claim 24, wherein suspending adaptive generation of the anti-noise signal while still outputting the anti-noise signal during detected wind periods.

26. The method of claim 24, wherein suspending adaptive generation of the anti-noise signal and suspending outputting the anti-noise signal during detected wind periods.

27. The method of claim 24, wherein suspending adaptive generation of the anti-noise signal and fading out outputting the anti-noise signal during detected wind periods.

28. The method of claim 27, wherein the anti-noise signal is faded out according to the wind's magnitude.

29. The method of claim 24, wherein the wind is detected by generating a correlation estimate between the feedforward input and error input.

30. The method of claim 29, further comprises filtering the feedforward input and error input before generating the correlation estimate.

31. The method claim 21, further comprises:

measuring a noise level in the feedforward input; and suspending anti-noise signal generation and output if the noise level is below a minimum threshold.

32. The method claim 21, further comprises:

measuring a noise level in the feedforward input; and suspending anti-noise signal generation and output if the noise level is above a maximum threshold.

33. The method claim 21, further comprises:

attenuating the feedforward input to keep the feedforward input below a limiting threshold.

34. A handset, comprising:

a speaker;

a feedforward microphone;

an error microphone, wherein the error microphone is located closer to the speaker than the feedforward microphone;

an adaptive noise control system, coupled to the feedforward and error microphone, to generate an anti-noise signal based on background noise captured from the feedforward microphone and an error signal captured from the error microphone, and to output the anti-noise signal to the speaker; and a speech detector, coupled to the adaptive noise control system, to detect speech and the adaptive noise control system further configured to suspend adaptive adjustment of the anti-noise signal while still providing the anti-noise signal at the speaker during detected periods of speech.

35. A system, comprising:

a first input to receive a first signal from a feedforward microphone;

a second input to receive a second signal from an error microphone;

a controller coupled to the inputs, the controller configured to generate an anti-noise signal based on the first signal and the second signal;

a wind detector coupled to the first input and second input, and configured to detect wind and to adjust the anti-noise signal during wind detected periods; and an output to transmit the anti-noise signal to a speaker, wherein the controller suspends adaptive adjustment of the active noise signal and fade out providing the anti-noise signal at the output according to a magnitude of the detected wind during wind detected periods.

36. The system of claim 35, wherein the wind detector comprises:

an energy detector receiving the second signal and generating an energy threshold output;

a correlation estimator receiving the first and second signals, generating a correlation estimate of the two signals; and a wind controller receiving the correlation estimate and energy threshold output and generating a wind control signal to be outputted to the controller.

37. The system of claim 35, further comprises a noise floor detector coupled to the first input to detect a noise level, wherein the controller halts anti-noise signal output based on whether the noise level crosses a noise level threshold.

* * * * *